United States Patent
Goodman et al.

(10) Patent No.: US 9,079,221 B2
(45) Date of Patent: Jul. 14, 2015

(54) ACOUSTIC TRANSDUCER WITH IMPEDANCE MATCHING LAYER

(75) Inventors: George David Goodman, Phoenixville, PA (US); Voldi E. Maki, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/984,716

(22) PCT Filed: Feb. 15, 2011

(86) PCT No.: PCT/US2011/024841
§ 371 (c)(1),
(2), (4) Date: Aug. 9, 2013

(87) PCT Pub. No.: WO2012/112137
PCT Pub. Date: Aug. 23, 2012

(65) Prior Publication Data
US 2013/0327139 A1    Dec. 12, 2013

(51) Int. Cl.
*G01V 1/40* (2006.01)
*E21B 44/00* (2006.01)
*E21B 44/08* (2006.01)
*B06B 1/06* (2006.01)
*G01V 1/02* (2006.01)
*G10K 11/02* (2006.01)

(52) U.S. Cl.
CPC ............ *B06B 1/0633* (2013.01); *B06B 1/0625* (2013.01); *G01V 1/159* (2013.01); *G10K 11/02* (2013.01); *G01V 1/40* (2013.01)

(58) Field of Classification Search
None
See application file for complete search history.

(56) References Cited

U.S. PATENT DOCUMENTS

| | | | |
|---|---|---|---|
| 3,086,195 A | 4/1963 | Halliday | |
| 3,138,219 A | 6/1964 | Blizard | |
| 4,297,607 A * | 10/1981 | Lynnworth et al. | 310/334 |
| 4,672,591 A | 6/1987 | Breimesser et al. | |
| 4,800,316 A | 1/1989 | Ju-Zhen | |

(Continued)

OTHER PUBLICATIONS

Charles S. Desilets, John D. Fraser, Gordon S. Kino, "The Design of Efficient Broad-Band Piezoelectric Transducers," IEEE Transactions on Sonics and Ultrasonics, vol. SU-25, No. 3, May 1978, pp. 115-125.

(Continued)

*Primary Examiner* — Andre Allen
(74) *Attorney, Agent, or Firm* — Howard L. Speight, PLLC

(57) ABSTRACT

A device includes a piezoelectric transducer. The transducer has N independent transducer regions. N is an integer. Each of the N independent transducer regions has a thickness. Each of the N independent transducer regions has an acoustic impedance AIT. Each of the N independent transducer regions is independently excitable to oscillate in the thickness mode when electrically excited by a potential difference applied across the thickness. The device further includes a first impedance matching layer having an acoustic impedance AI1 and AIT and a borehole fluid acoustic impedance AIBF. The first impedance matching layer is situated such that an acoustic signal emitted by the piezoelectric transducer will pass through the second impedance matching layer. The device further includes a second impedance matching layer having an acoustic impedance AI2 between AI1 and AIBF. The second impedance matching layer is situated in the device such that an acoustic signal emitted by the transducer will pass through the second impedance matching layer after it passes through the first impedance matching layer.

29 Claims, 7 Drawing Sheets

(56) References Cited

U.S. PATENT DOCUMENTS

| | | |
|---|---|---|
| 5,044,462 A | 9/1991 | Maki, Jr. |
| 5,317,111 A | 5/1994 | Orban et al. |
| 5,343,443 A | 8/1994 | Merewether |
| 5,354,956 A | 10/1994 | Orban et al. |
| 5,400,788 A | 3/1995 | Dias et al. |
| 5,488,954 A | 2/1996 | Sleva et al. |
| 5,644,186 A | 7/1997 | Birchak et al. |
| 5,717,169 A | 2/1998 | Liang et al. |
| 5,852,587 A | 12/1998 | Kostek et al. |
| 6,213,250 B1 | 4/2001 | Wisniewski et al. |
| 6,225,728 B1 * | 5/2001 | Gururaja ............... 310/334 |
| 6,307,302 B1 | 10/2001 | Toda |
| 6,354,146 B1 | 3/2002 | Birchak et al. |
| 6,466,513 B1 | 10/2002 | Pabon et al. |
| 6,470,749 B1 | 10/2002 | Han et al. |
| 6,513,385 B1 | 2/2003 | Han et al. |
| 6,589,174 B1 | 7/2003 | Chopra et al. |
| 6,822,374 B1 | 11/2004 | Smith et al. |
| 6,989,625 B2 | 1/2006 | Suzuki et al. |
| 6,995,500 B2 | 2/2006 | Yogeswaren |
| 7,036,363 B2 | 5/2006 | Yogeswaren |
| 7,075,215 B2 | 7/2006 | Yogeswaren |
| 7,356,905 B2 | 4/2008 | Ketterling et al. |
| 7,389,569 B2 | 6/2008 | Shiraishi et al. |
| 7,454,024 B2 | 11/2008 | Ketterling et al. |
| 7,474,041 B2 | 1/2009 | Ketterling et al. |
| 7,508,118 B2 | 3/2009 | Imahashi et al. |
| 7,513,147 B2 | 4/2009 | Yogeswaren |
| 2004/0095847 A1 | 5/2004 | Hassan et al. |
| 2005/0000279 A1 * | 1/2005 | Yogeswaren ............ 73/152.58 |
| 2005/0184620 A1 | 8/2005 | Choi et al. |
| 2005/0264133 A1 | 12/2005 | Ketterling et al. |
| 2006/0185430 A1 * | 8/2006 | Yogeswaren ............ 73/152.16 |
| 2007/0093702 A1 | 4/2007 | Yu et al. |
| 2008/0185937 A1 | 8/2008 | Ketterling et al. |
| 2008/0276724 A1 * | 11/2008 | Straub et al. ............ 73/861.18 |
| 2009/0222209 A1 | 9/2009 | Morys |
| 2010/0152591 A1 | 6/2010 | Yu et al. |
| 2012/0007471 A1 * | 1/2012 | Tai ......................... 310/334 |

OTHER PUBLICATIONS

Marian Morys, Roland Chemali, George Goodman, Glenn Smollinger, Bill Schaecher, Voldi Maki, "Field Testing of an Advanced LWD Imager for Oil-Based Mud Applications," SPWLA 51st Annual Logging Symposium, Jun. 19-23, 2010.

Physik Instrumente, "Designing with Piezoelectric Transducers: Nanopositioning Fundamentals," Sep. 2005.

Piezo Systems, Inc. "Introduction to Piezo Transducers," found at http://www.piezo.com/tech2intropiezotrans.html on Jan. 19, 2011.

S.J.H. van Kervel and J.M. Thijssen, "A calculation scheme for the optimumdesign of ultrasonic transducers," Ultrasonics, May 1983 (1983 Butterworth & Co (Publishers) Ltd).

Voldi Maki, Stan Gianzero, Robert Strickland, H. Neil Keppel, and Mark V. Gianzcro, "Dynamically Focused Transducer Applied to the Cast Imaging Tool," SPWLA 32nd Annual Logging Symposium, Jun. 16-19, 1991.

Intellectual Property Office of Singapore, Invitation to Respond to Written Opinion, Singapore Patent Application Reference No. 2014/266195254Y, which is the SG counterpart of the instant application, Jun. 16, 2014.

European Patent Office, European Search Report, Application No./Patent No. 11858597.5-1559/2603820 PCT/US2011024841, which is an EP counterpart to the instant application, Jan. 23, 2015.

European Patent Office, European Search Report, Application No./Patent No. 13179501.5-1559/2662154, which is a divisional of an EP counterpart to the instant application, Jan. 23, 2015.

"Acoustic Impedance" Online Calculator. https://www.nde-ed.org/EducationResources/CommunityCollege/Ultrasonics/Physics/acousticimpedance.htm.

Alan R. Selfridge "Approximate Material Properties in Isotropic Materials," IEEE Transactions on Sonics and Ultrasonics, vol. Su-32, No. 3, May 1985.

European Patent Office, Supplementary European Search Report, Application No./Patent No. 11858597.5-1559/2603820 PCT/US2011024841, which is a counterpart of the instant application, Jan. 23, 2015.

* cited by examiner

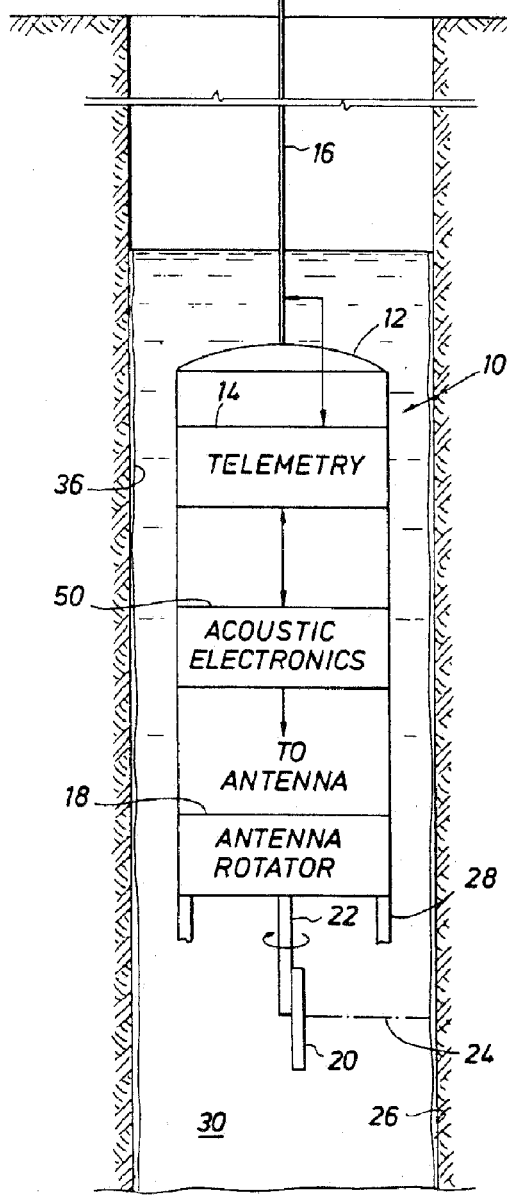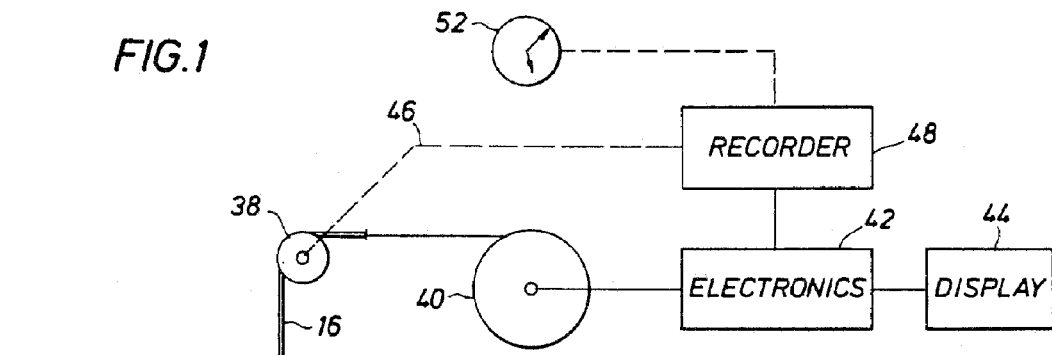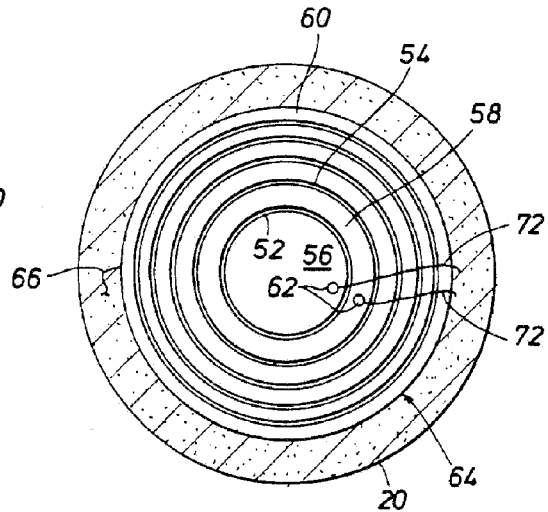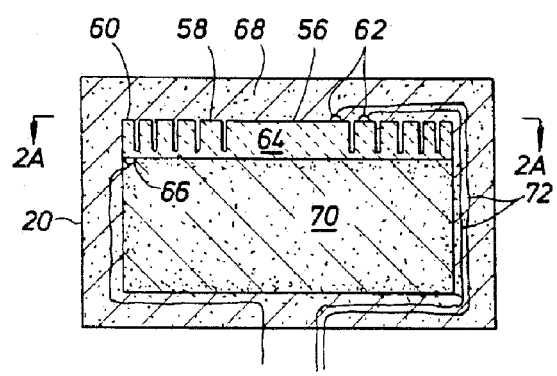

FIG. 3A
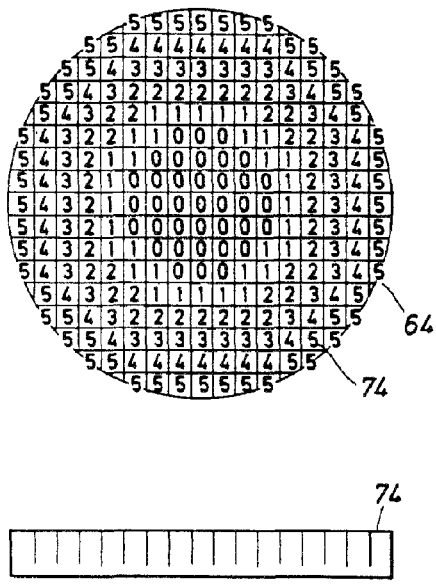
FIG. 3B
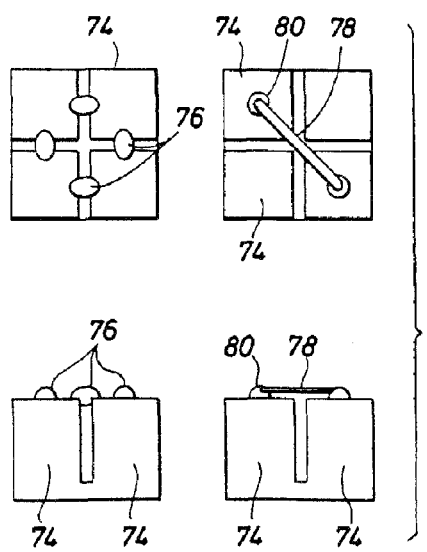
FIG. 3C
FIG. 4
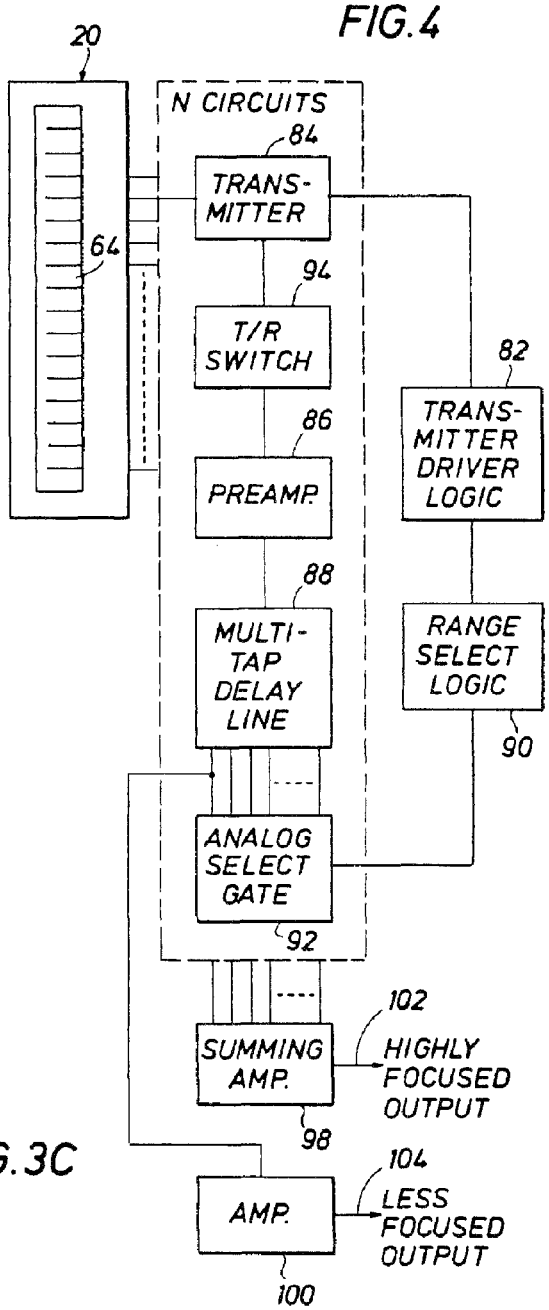

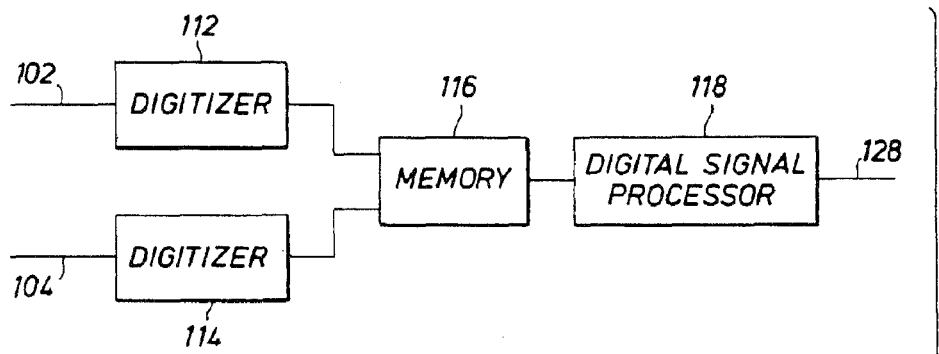
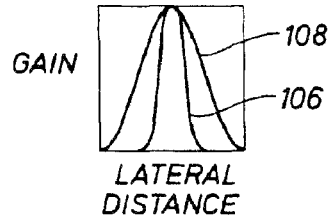
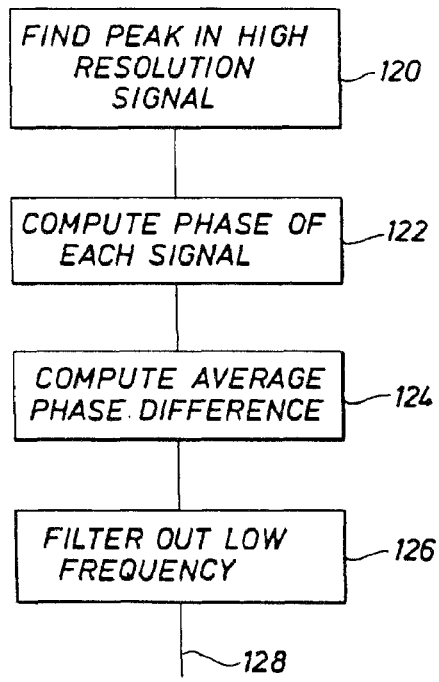
FIG. 5

ACOUSTIC TRANSDUCER WITH IMPEDANCE MATCHING LAYER

CROSS-REFERENCE TO RELATED APPLICATIONS

This application is the National Stage of International Application No. PCT/US2011/24841, filed on Feb. 15, 2011.

BACKGROUND

Acoustic transducers are used for a variety of purposes, including in the oil field. A focused planar transducer, such as that described in U.S. Pat. No. 5,044,462, which is owned by the assignee of the instant application, allow acoustic illumination with focus and depth of field. Transferring energy from an acoustic transducer to fluids in a borehole is a challenge.

BRIEF DESCRIPTION OF THE DRAWINGS

FIG. 1 is a sectional view through an acoustic measuring tool in accordance with the teachings of the present disclosure suspended in a well borehole and which incorporates a rotatable transducer antenna for sending and receiving acoustic pulses against the sidewall of the borehole FIGS. 2A and 2B are enlarged views of the acoustic transmitter element having several grooves cut therein to define concentric rings for transmitting purposes.

FIGS. 3A and 3B are an alternate form of an acoustic transmitter element utilizing square cuts in the ceramic member showing the square elements connected in the manner shown in FIG. 3C to closely approximate the rings of the transmitter element of FIG. 2.

FIG. 4 is an electronic schematic block diagram showing the components of the transducer system and selected waveforms.

FIG. 5 is a block diagram showing the implementation of the phase contrast imaging process using digitized data and also shows a gain curve and a processing flow chart.

DETAILED DESCRIPTION

Figure 6:
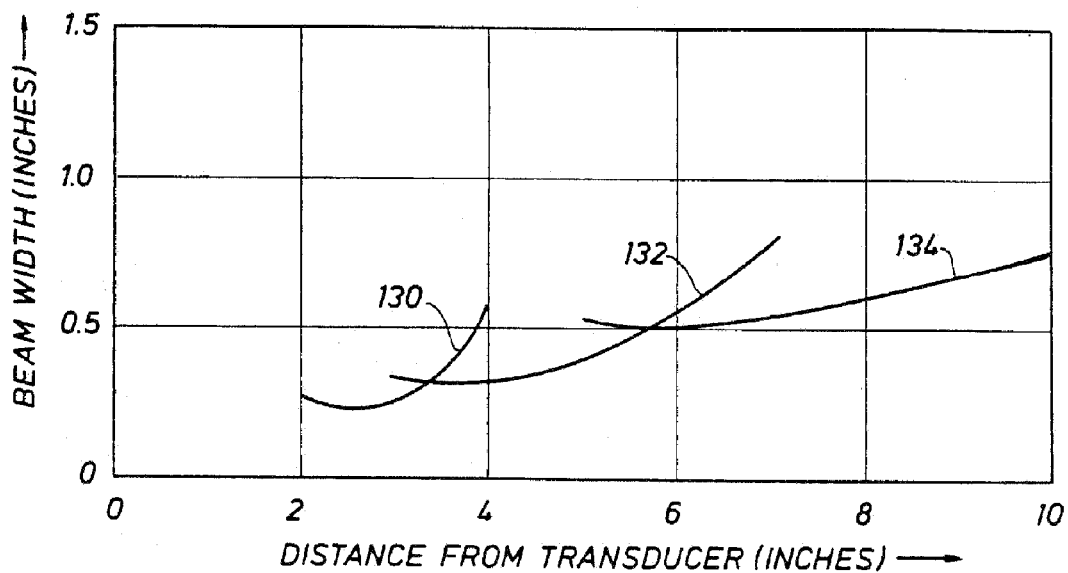
FIG. 6 is a graph showing beam widths as a function of range and chosen focusing distance.

Attention is directed now to FIG. 1 of the drawings where the numeral 10 identifies an acoustic measuring device supported in a sonde 12 in accordance with the teachings of the present disclosure. The sonde encloses a telemetry system 14 which provides an output signal on a logging cable 16 which extends to the surface. The sonde includes an antenna rotator 18 for rotating an antenna or transducer 20 in accordance with the present disclosure. It will be described in greater detail hereinafter. The antenna is mounted on a rotatable mechanism 22 so that the emitted acoustic pulse travels radially outwardly along a propagation line 24 and impinges on the sidewall 26 of the borehole. The sonde 12 is constructed with a housing 28 which is elongate and cylindrical. The antenna 20 is preferably submerged in the borehole fluid 30 to provide better acoustic coupling and reduced beam divergence than that offered by enclosing the transducer in an oil bath and utilizing a window for the acoustic energy to pass through.

As will be understood, the well borehole 26 has been represented as a relatively smooth surface. In fact, it is not and it can be irregular depending on the nature of the drilling process and the nature of the formations penetrated by the borehole 26.

The conductor 16 extends to the surface where it passes over a sheave 38. The sheave 38 directs the logging cable 16 to a drum 40 where it is spooled for storage. The conductors in the cable 16 are connected with surface located electronics 42. The output data is displayed on a display 44. The data is recorded electronically 48, simultaneously with depth and time. The time is obtained from a real time clock 52 with millisecond resolution. The depth is provided by an electrical or mechanical depth measuring apparatus 46 which is connected with the sheave 38 and which also connects to the recorder 48. The present apparatus further includes acoustic electronics 50 which are supported in the sonde. The acoustic logging device 10 will be understood on explanation of the various components discussed below.

The antenna 20 is better identified in FIGS. 2A and 2B of the drawings where it is shown to be a circular piezoelectric disk member 64. It is poled in the thickness mode, typically having both flat surfaces coated with a conducting metal electrode. It has a solid backing 70 which acts as a highly attenuative medium absorbing the acoustic energy which is radiated into it. The ceramic and backing are housed in an epoxy material 68 having a thickness separating the ceramic from the borehole fluid by a quarter wavelength. This material 68, having an intermediate acoustic impedance, is a well known technique for improving the transfer of acoustic energy from the ceramic which has a high impedance to the water (mud) which has a lower impedance. The ceramic is cut with a plurality of circular grooves at 52 and 54. These grooves typically do not fully penetrate the ceramic device for ease of manufacturing. Rather, they define ring shaped surface areas and provide acoustic as well as electrical isolation between the individual elements. Inside the smallest ring shaped surface 58 is the center disk 56. This pattern continues to the outer ring shaped area 60. Electrical attachments are made to the ceramic using solder or conductive epoxy. The ground electrode 66 is attached before the ceramic is bonded to the backing material. Each of the rings is attached at 62 to conductors 72 using either solder or conductive epoxy. The wires, now attached to the various rings, and a single ground electrode are preferably led to the back of the transducer, being held in place by the surrounding epoxy housing 68. The total number of ring shaped areas is N where N is a whole number integer. Moreover, N is typically in the range of about three at the low end, and increases up to about ten. In theory, N can increase further, but there is a practical limit in the benefit obtained by increasing N. The optimum number for N is about three to eight. In this particular embodiment, the rings are not evenly spaced radially but are spaced based upon a more subtle criterion. They are spaced such that when focused at the minimum range, the difference in time delay required for each ring is a fixed value. This procedure simplifies the electronics components somewhat. The delay differences for all of the ranges may be kept the same simplifying the electronic design. Even if respective delays are slightly imperfect, there is little degradation in the resulting focusing. There are other methodologies which may be used to select the spacings of the rings.

FIGS. 3A and 3B show an alternate method for defining the ring shaped pattern on the ceramic element 64. The ceramic 64 is cut into square elements 74. The individual elements are then connected to form a set of interconnected areas simulating a ring shaped area. One example is as shown where the elements all labeled 0 are connected together. Likewise, all elements labeled 1 are connected, and so on, through the elements labeled 5. This method of construction has several advantages over the simple ring configuration. The straight lines are easier to cut using standard production tools. In the previous design, each of the rings has a slightly different resonant frequency because their geometries are each slightly different. The differences in frequency, slightly reduce the imaging resolution of the transducer. The cuts are again 90 percent of the way through the solid ceramic body and are preferably less than 0.6 times the thickness of the ceramic in spacing. The electrodes of the individual square elements 74 are connected in FIG. 3C using small beads of silver epoxy, 76 to connect the correct pattern of square surfaces. Where a diagonal connection is required, a wire 78 is placed across the diagonal and silver epoxy 80 is used to bond it to the square element 74 and hold it above any elements it crosses without connection. The wires to the electronics are attached as shown in FIG. 2. The resonant frequency of each square element is the same but slightly lower than the basic thickness resonance of the disk. The result is that each ring formed by the set of squares has the same resonant frequency and mechanical Q. Each of the rings therefore behaves almost identically in their source and receiver characteristics.

Each of the rings 56, 58 and 60 shown in FIG. 2A ranging from the smallest on the inside to the largest on the exterior is used as a separate transmitting transducer. They are connected to their own dedicated transmitter and receiver units. This is better shown on review of FIG. 4 of the drawing where the electronics is shown. First of all, the electronics in FIG. 4 includes N duplicate circuits. Thus, if there are six rings in the acoustic transducer assembly, then six duplicate circuits are provided. The description set forth hereinbelow can therefore be extended to all of the N circuits. The acoustic electronics 50 incorporates range select logic 90 which determines the focal distance of the transducer, both for the transmit mode and the receive mode. The transmit focus may be controlled independently from the receive focus. The transmit focal distance is sent to the timing driver logic 82 which controls the N signals going to each of the N transmitter circuits 84. In its simplest format the transmit pulse is delayed by the decrease in travel time required for the acoustic energy to propagate from each ring to the desired focal depth as the ring diameter decreases. The outer ring typically has no delay, and the inner disk has the most delay. The signal out of the transmitter circuit 84 may be either a single pulse or a burst (typically a square wave) signal at the resonant frequency of the transducer. The N transmit-receive switches 94 are used to protect the N preamp circuits from the high voltage transmit pulse on the ceramic. The preamps 86 have typically 20 dB of gain to get the signal level up to a suitable level and have a lower output impedance than the ceramic, allowing them to drive the delay lines 88. The N multiple tap delay lines are used to compensate for the travel time differences of the signal at some focal distance propagating to each ring of the transducer. Again the signal from the center disk will be delayed the most since it will be the closest to the focus, and the outer ring signal will be delayed the least since it is the farthest from the focus. As the focal distance increases, the total range of delays decreases. The outputs of the taps of the delay line go into N sets of analog select gates 92. Although an arbitrarily large number of taps may be used, a number of from 3 to 10 is sufficient. This gives from 3 to 10 discrete focal distances for the transducer. The tap selection and thusly the receiver focal distance is controlled by the range select logic 90. The delay taps are thus selected such that the N signals coming from a chosen focal distance all appear at the outputs of the N analog select gates simultaneously. The N signals are summed in the summing amplifier 98 to produce the focused signal output 102. A second output 104 is also made available which is the signal from only the center element. The peak of the envelope of the signal 102 forms the amplitude signal. The time location of the onset of this signal is used to derive the travel time, indicating the range to the borehole wall. This forms the typical output signal provided to the surface through the telemetry so that the system presents an image of what is seen by the equipment in the borehole. The signal processing this signal 102 has been described in previous works.

The phase contrast imaging utilizes the signals 102 and 104. While the signal 102 represents the highly resolved beam and the signal 104 represents a less resolved beam, FIG. 5 shows one implementation of the phase contrast imaging process. The gain graph shows the spatial resolution of the two signals 102 and 104, where the curve 106 is the resolution of 102 and the curve 108 is the resolution of 104. In this processing method, both signals are digitized at about 20 times the resonant frequency of the transducer by the digitizers 112 and 114 and the data are stored in the memory 116. The two signals are then processed by a digital signal processor 118 to find the differences in arrival times. The signal processing sequence begins at the step 120 where the location of the peak of the high resolution signal is found. The phase of both signals is then computed in the step 122, beginning in time where the envelope of the signal becomes greater than one-half the peak value until it drops in amplitude to below one-half the peak. The average phase difference over the measurement period is then computed in the step 124. These measurements may be filtered to pass high frequency content in the step 126 over the period of one revolution to remove the effects of the changes in the travel time to the borehole wall because of ellipticity or eccentering of the tool. The phase contrast data 128 may now be sent up hole and displayed as a gray scale image in place of the usual travel time image.

The presentation is typically presented as a function of depth in the well and as azimuth. For instance, a particular image might be obtained wherein the depth is 8,000 feet, and the image is positioned so that it is centered on an acoustic propagation line which has an azimuth of zero degrees or north. Benefits of the present system can be obtained on review of the graphs. FIG. 6 shows the 3 dB beam widths for three focal distances of a 2.5 inch diameter transducer operating at 280 kHz. When the transducer is focused at 2.4 inches, the three dB beam width is 0.22 inches according to the curve 130. As the distance to the target changes, the beam width increases significantly, as would the case be for a fixed focusing transducer. If for instance the range increases to 4 inches, the fixed focus transducer would have a beam width of 0.55 inches. The electronically focused transducer could be refocused and produce a beam-width of 0.31 inches, see the curve 132. From this, it may be seen that the depth of field is relatively small when the transducer is focused at a short distance. This would indicate that a single fixed focus transducer would only work well when the distance to the borehole wall was close to the focal distance of the transducer. With the electronically focused transducer, the focal distance can be changed to match the variations in the range to the sidewall with what ever precision is deemed suitable. It may be seen that, as the range increases to 6 inches, the focusing does not need to be changed by a distance shown in the curve 134, or about 10 inches as illustrated.

Figure 7:
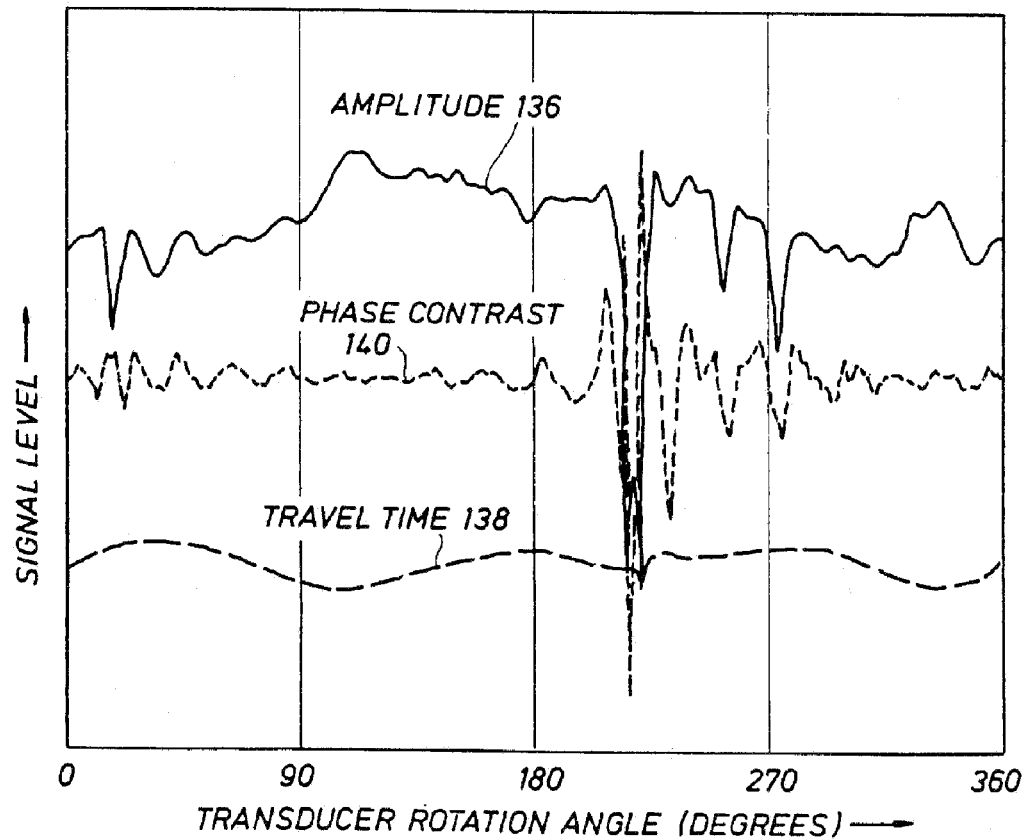
FIG. 7 is a graph showing a comparison between amplitude, travel time, and phase contrast processing of data.

Several processed signals are shown in FIG. 7. The amplitude 136 of the echo from a simulated formation shows many small features. Several decreases in the signal amplitude are shown which are from irregularities in the surface. The travel time data 138 shows some of this information. Several of the events shown on the amplitude data are not visible in the travel time data. The travel time image is not as well resolved as the amplitude image. The phase contrast image data 140 shows as much information as the amplitude data 136. In the past, little correlation could be made between travel time and amplitude data because of the differences in resolution. Since they now have the same resolution, good correlations can be made. Each event in the amplitude data may now be correlated with the phase contrast data so that changes in acoustic impedance may be separated from changes in the surface character.

The illustrated system is able to provide better and more detailed observation of events occurring in the borehole in that it presents surface detail data not otherwise obtainable heretofore. This enhanced sensitivity enables the device to present data with improved resolution and sensitivity. Moreover, the depth of field is enhanced. Further, the sensitivity of the system to variations in range is reduced, thereby enabling the device to operate over a wider dynamic range so that the greater irregularities in the borehole 26 can be observed. Dynamic focusing correction is markedly improved over the fixed focus system exemplified in UK patent 2,168,569A. The surface character measurement has also been enhanced.

Figure 8:
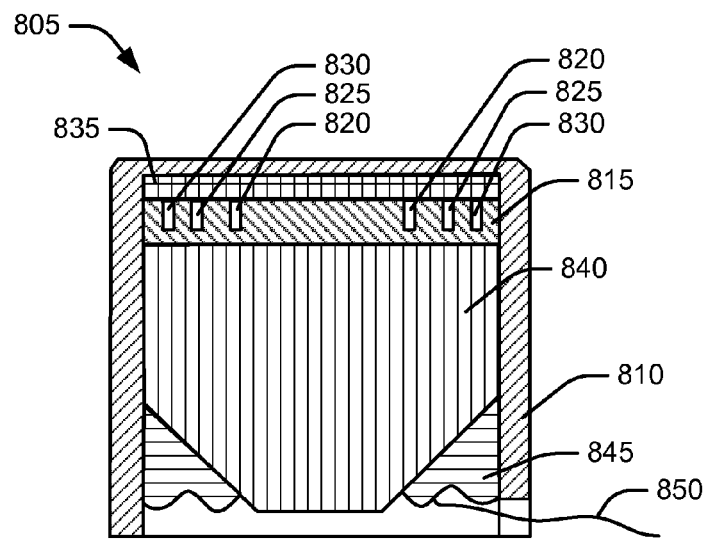
FIG. 8 is a sectional view through an acoustic transmitter element having an acoustic impedance matching layer.

In one embodiment, illustrated in FIG. 8, an impedance matching layer is added to the antenna (or "acoustic transducer" or "transducer") 805. In one embodiment, the acoustic transducer components are housed within a glass filled polyether ether keytone ("PEEK") housing 810. PEEK provides mechanical strength for the downhole drilling environment and has low loss acoustic properties. In one embodiment, an epoxy or another material having acoustic properties that are intermediate between the impedance of the ceramic and the borehole fluid is used to construct the housing 810. In one embodiment, as mentioned above, the housing 810 provides one layer of acoustic impedance matching.

In one embodiment, a piezoelectric ceramic disk 815 provides the active element and is cut with slots as shown in FIGS. 2A and 2B, or into square elements 74 as shown in FIGS. 3A and 3B. In FIG. 8, the piezoelectric ceramic disc 815 is cut with slots 820, 825, 830. The portions of the piezoelectric ceramic disk 815 between the slots 820, 825, 830 and the small squares shown in FIGS. 3A and 3B are elements of a phased array that can be used to focus acoustic signals emitted by the piezoelectric ceramic disk 815 as described above with respect to FIGS. 4 and 5.

In one embodiment, an impedance matching layer 835 is provided between the piezoelectric ceramic disk 815 and the housing 810. In one embodiment, the purpose of the impedance matching layer 835 is to provide a better match between the acoustic impedance of the piezoelectric ceramic disk 815, which is typically high, and the acoustic impedance of a fluid in a borehole, such as drilling mud or formation fluid, which is typically lower than that of the piezoelectric ceramic disk 815. In one embodiment, the housing 810 provides an additional impedance matching layer which means that the acoustic transducer 805 has two impedance matching layers. In one embodiment:

$$AIT > AI1 > AI2 > AIBF$$

where:
AIT is the acoustic impedance of the transducer; i.e., the acoustic impedance of the piezoelectric ceramic disk 815;
AI1 is the acoustic impedance of the impedance matching layer 835;
AI2 is the acoustic impedance of the housing 810; and
AIBF is the acoustic impedance of the borehole fluid (e.g., borehole fluid 30 shown in FIG. 1).

In one embodiment, additional impedance matching layers (not shown) are provided between the piezoelectric ceramic disk 815 and the housing 810. In one embodiment, the acoustic impedance of the impedance matching layers generally increase the closer they are to the piezoelectric ceramic disk 815, although some deviation from this is envisioned. That is, the scope of the claims is intended to cover embodiments in which a small number of impedance matching layers relative to the total number of impedance matching layers do not strictly follow the monotonic change in acoustic impedance from the piezoelectric ceramic disk 815 to the housing.

In one embodiment, the impedance matching layer 835 is made of one part DURALCO® 4460 epoxy mixed with 68 parts hematite by weight. The particle size of the hematite is typical of that used in oil based drilling mud. In one embodiment, the mixture is exposed to a vacuum until no bubbles are present in the mixture and molded onto a flat TEFLON® surface to an initial depth of 3 times the final thickness. In one embodiment, the epoxy is cured at 180° F. for 4 hours, then at 220° F. for 4 hours. In one embodiment, the lower density epoxy at the top is removed until the thickness is ¼ wavelength at the center frequency of the transducer. In one embodiment, the resulting material in this process has an acoustic impedance of 8.2 MRayls a density of 2.82 g/cm$^3$ and a sound velocity of 2900 m/sec. In one embodiment, the surfaces of the resulting disk are finished flat and smooth and placed between the ceramic crystal and the PEEK housing.

In one embodiment, the piezoelectric ceramic disk 815 is supported by a backing material 840 that also absorbs acoustic energy traveling from the piezoelectric ceramic disk 815 away from the impedance matching layer 835. In one embodiment, an epoxy casting resin 845 is used to close the housing and provide strain relief for the electrical conductors 850 attached to the piezoelectric ceramic disk 815. The connection of the electrical conductors 850 to the piezoelectric ceramic disk 815 is not shown in FIG. 8 but, in one embodiment, is similar to that shown in FIG. 2B.

Figure 9A:
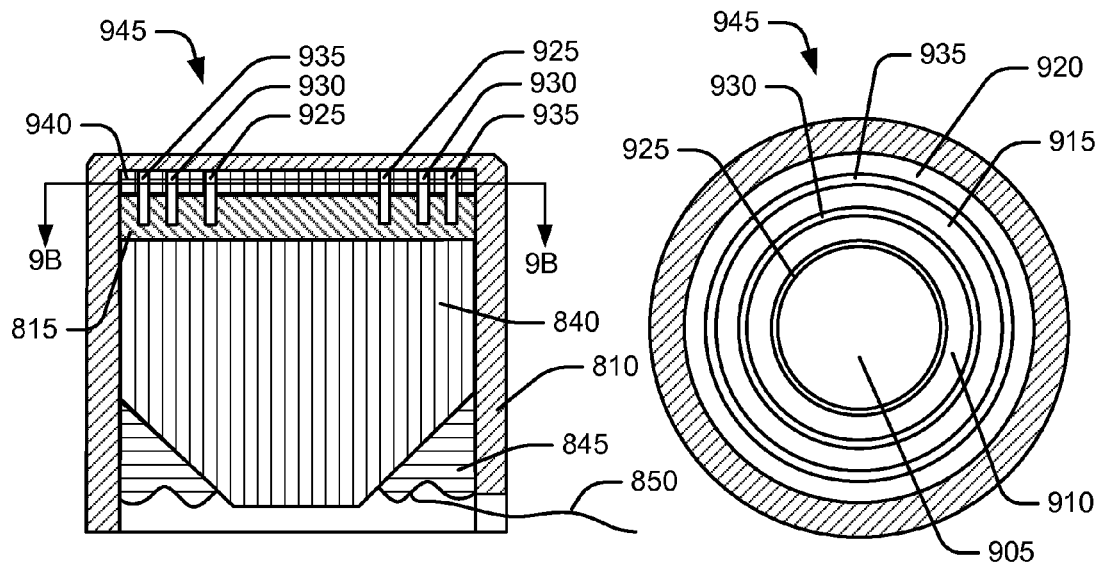
FIG. 9A is a sectional view through an acoustic transmitter element having an acoustic impedance matching layer, having slots cut through the acoustic impedance matching layer and into a piezoelectric ceramic disk.
Figure 9B:
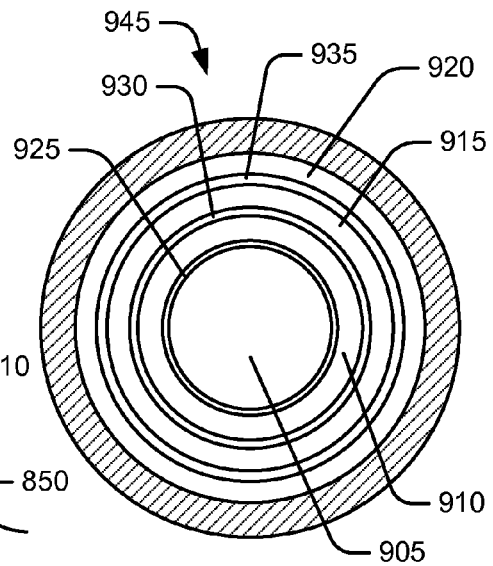
FIG. 9B is a plan view of the acoustic transmitter element of FIG. 9A.

In one embodiment, illustrated in FIGS. 9A and 9B, rings 905, 910, 915, 920 are formed by cutting slots 925, 930, 935 through an impedance matching layer 940 and partially through the piezoelectric ceramic disk 815. In one embodiment, the slots 925, 930, 935 form the four independent active sources 905, 910, 915, 920 for the focusing of the resulting acoustic transducer 945. The PEEK housing 810 is not cut because of the requirement that it protect the interior materials from the borehole fluid and abrasive materials contained therein.

In one embodiment using the ring pattern illustrated in FIGS. 3A, 3B, and 3C, the impedance matching layer 940 is cut in the same way as illustrated in FIG. 3A.

In one embodiment, the cuts 925, 930, 935 are only partially through the impedance matching layer 940. In one embodiment, the partial cuts are through the side closest to the housing 810. In one embodiment, the partial cuts are through the side closest to the piezoelectric crystal disk 815.

In one embodiment, the impedance matching layer 940 has N independent impedance matching layer regions that match and overlay the N independent transducer regions. That is, the four rings 905, 910, 915, 920 illustrated in FIG. 9B include rings cut in the piezoelectric ceramic disk 815 and matching and overlaying rings cut in the impedance matching layer 940.

In one embodiment, in which the piezoelectric ceramic disk 815 is cut as shown in FIG. 3A and connected into regions (e.g., regions 1, 2, 3, 4, and 5) illustrated in FIG. 3A using the techniques shown in FIG. 3C, the regions in the impedance matching layer 940 match and cover the small squares, e.g. square 74, but are not connected together to form the regions (e.g., regions 1, 2, 3, 4, and 5). In one embodiment, the piezoelectric ceramic disk 815 is cut as shown in FIG. 3A and connected into regions (e.g., regions 1, 2, 3, 4, and 5) illustrated in FIG. 3A using the techniques shown in FIG. 3C, and the impedance matching layer 940 is then applied and slots are cut into the impedance matching layer 940 to match the regions illustrated in FIG. 3A.

In one embodiment, the focus distance of the transducer 945, with an active surface diameter of 1.25 inches and a focus distance of 0.56 inches has an outer ring 920 width of 0.734 inches. The thickness of the ring when manufactured to be ¼ wavelength thick at 350 kHz will be 0.0878 inches. In this embodiment, the sheer coupling between adjacent segments will be significant. The shear loading will significantly affect the energy coupled into the face of the transducer and eventually into the volume to be measured. In one embodiment, a polymer with low shear stiffness or a fluid is inserted between adjacent phased-array elements of the piezoelectric ceramic disc 815, which improves the operating characteristics compared to a continuous layer. The process of cutting the intermediate layer to match the ceramic active areas allows the use of ceramic materials, which exhibit a smaller change in characteristics with temperature and lower acoustic loss than weighted polymers.

In one embodiment, the slots 925, 930, 935 improve the performance of the impedance matching layer 940 by eliminating the shear coupling between segments or rings of the impedance matching layer 940 that are not moving in the same direction. In one embodiment, the loss in signal amplitude due to unwanted shear loading is reduced.

In one embodiment, when the transducer 945 is focused at short range, 0.56 inches, for example, the phase difference between signals on adjacent rings (e.g., rings 905 and 910) will be 150 degrees. Adjacent rings will be moving in almost opposite directions.

In one embodiment, cutting the rings in the impedance matching layer 940 to reduce the coupling between the phased array elements is independent of how the ring electrodes are formed in the crystal. In other words, it is sometimes not necessary to cut groves in the crystal to create the ringed electrodes because of the properties of the crystal. That is, in one embodiment, the benefits of the impedance matching layer 940 are not dependent on how the phased array is formed in the crystal.

The desire is to improve the acoustic impedance match as the acoustic wave propagates through the matching layers towards the intended target while maintaining its phase integrity. Reducing the shear coupling in the matching layer enhances focusing and signal-to-noise performance. In addition, the slots improve electric isolation between the phased array elements. The undesired coupling between electrodes is electromechanical. The dominant coupling component occurs in the crystal; however, the electrodes also produce an electric field between the electrodes at the surface of the crystal. The capacitance coupling that result from this electric field component is dependent on the permittivity of the selected acoustic matching layer 940 material. The field intensity falls quickly with distance from the crystal face. The cuts in the acoustic matching layer 940 effectively introduce a series element, with lower permittivity, that impedes displacement current. The burden on the drive electronics is reduced and better isolation results.

In one embodiment, the regions of the impedance matching layer 940 have the same acoustic impedance. In one embodiment, at least one of the regions of the impedance matching layer 940 has a different acoustic impedance than another of the regions of the impedance matching layer 940. For example, in one embodiment, the impedance matching layer 940 is formed using a protective face (e.g., PEEK) on the piezoelectric ceramic disk 815 with non-uniform thickness providing different matching layer impedances for the array elements.

In one embodiment, cutting slots into the impedance matching layer 940 significantly reduces the shear coupling between each signal path until the signal reaches the PEEK. In one embodiment, the PEEK is not cut to withstand the harsh borehole environment and the loss is tolerated.

Figure 10:
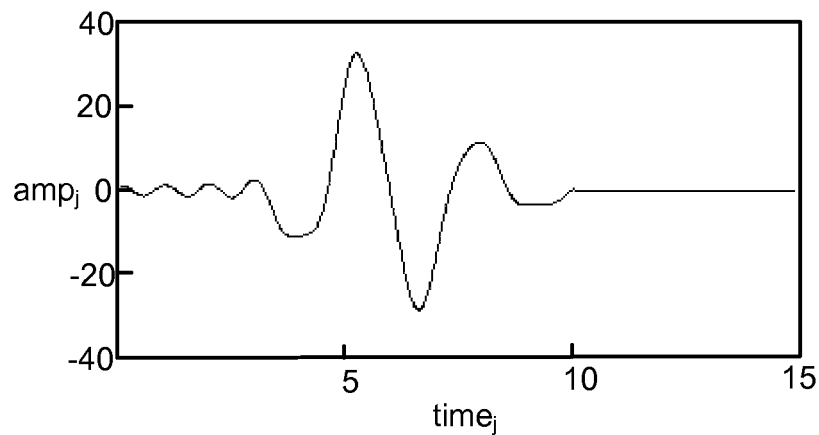
FIG. 10 shows a transmitted signal without an acoustic impedance matching layer.
Figure 11:
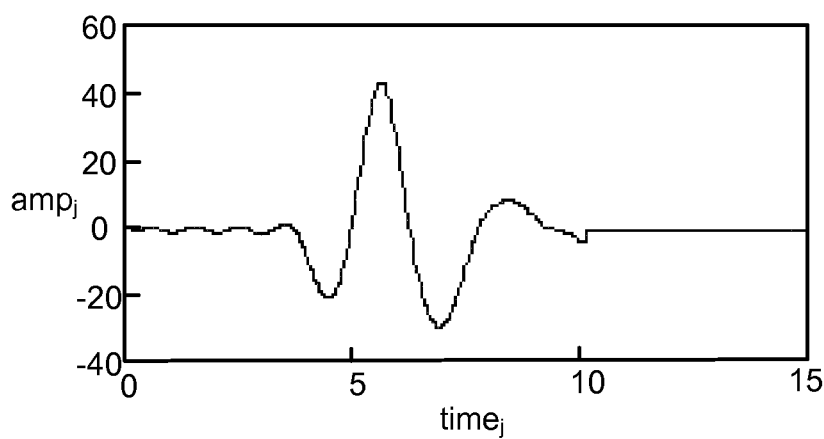
FIG. 11 shows a transmitted signal with an acoustic impedance matching layer.

FIGS. 10 and 11 show the difference in signal amplitude transmitted effected by changing from one layer of PEEK with optimum thickness (FIG. 10) to a layer of PEEK and an optimized impedance matching layer 940 (FIG. 11). As can be seen, the use of the extra impedance matching layer increases the signal amplitude by 2.5 dB for transmit signal. The overall improvement is 5 dB since the received signal also experiences the improvement. The sensitivity of the transducer is almost doubled by the addition of the impedance matching layer 940.

In one embodiment, the transducers 805 and 945 are used in measurement-while-drilling/logging-while-drilling ("MWD/LWD") systems, wired drillpipe systems, coiled tubing systems (wired and unwired), and wireline systems. In one embodiment of an MWD/LWD system using electronics such as that illustrated in FIG. 5 located downhole, the electronics are powered by an onboard battery or by a generator, such as a mud generator. In one embodiment, power is provided from the surface. In one embodiment, all of the processing discussed above, such as that associated with FIG. 5 is done downhole. In one embodiment, the processing is done on the surface, for example by electronics 42 in FIG. 1.

Figure 12:
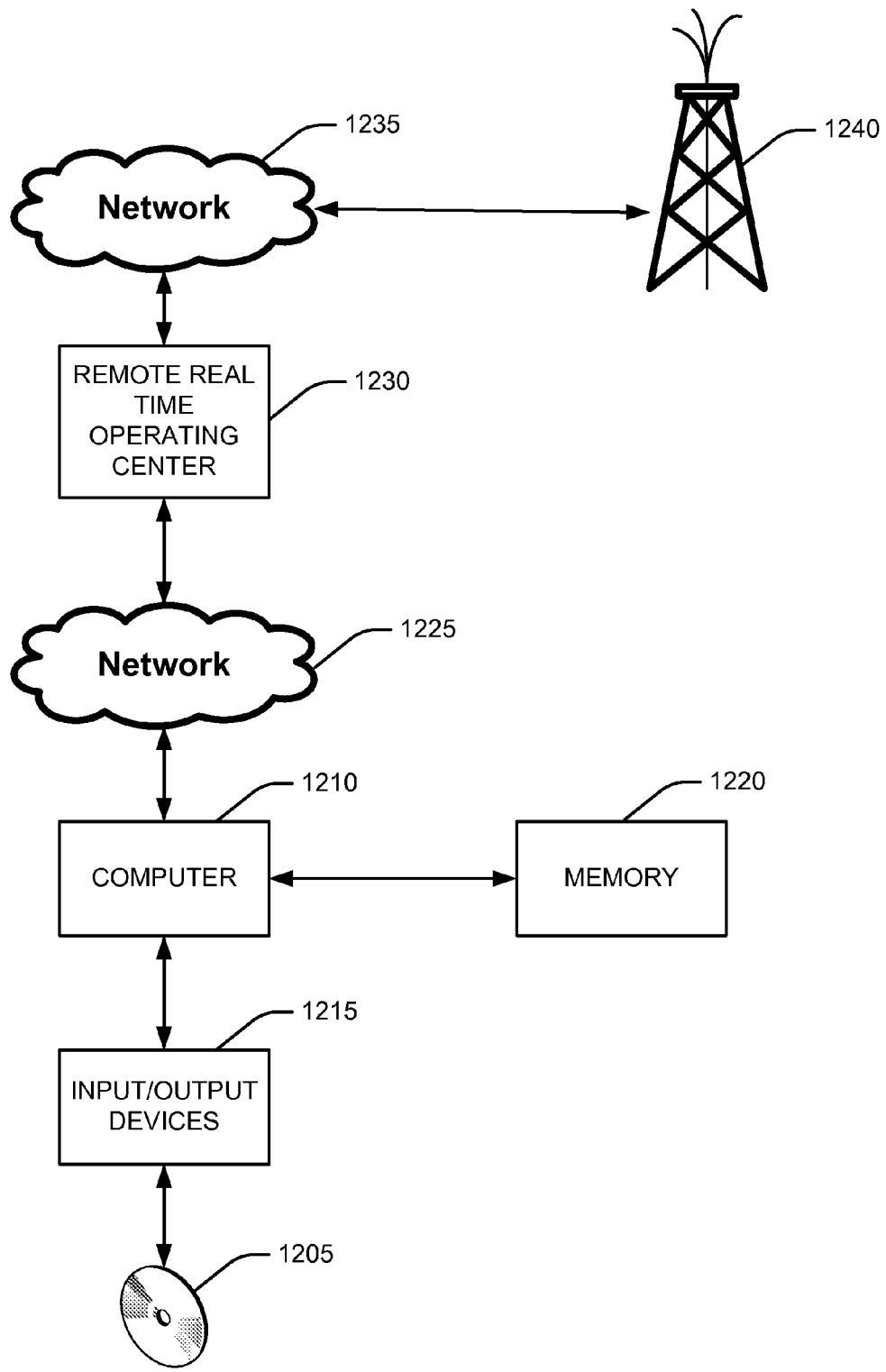

In one embodiment, the controller for the electronics shown in FIG. 5 is stored in the form of a computer program on a computer readable media 1205, such as a CD or DVD, as shown in FIG. 12. In one embodiment a computer 1210, which may be the same as electronics 42 or acoustic electronics 50 (see FIG. 1), or which may be below the surface in the drill string, reads the computer program from the computer readable media 1205 through an input/output device 1215 and stores it in a memory 1220 where it is prepared for execution through compiling and linking, if necessary, and then executed. In one embodiment, the system accepts inputs through an input/output device 1215, such as a keyboard, and provides outputs through an input/output device 1215, such as a monitor or printer. In one embodiment, the system stores the results of calculations in memory 1220 or modifies such calculations that already exist in memory 1220.

In one embodiment, the results of calculations that reside in memory 1220 are made available through a network 1225 to a remote real time operating center 1230. In one embodiment, the remote real time operating center 1230 makes the results of calculations available through a network 1235 to help in the planning of oil wells 1240 or in the drilling of oil wells 1240.

The text above describes one or more specific embodiments of a broader invention. The invention also is carried out in a variety of alternate embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device comprising:
a piezoelectric transducer, the transducer having N independent transducer regions wherein N is an integer, each of the N independent transducer regions having a thickness, each of the N independent transducer regions having an acoustic impedance AIT, each of the N independent transducer regions being independently excitable to oscillate in the thickness mode when electrically excited by a potential difference applied across the thickness;
a first impedance matching layer having an acoustic impedance AI1 between AIT and a borehole fluid acoustic impedance AIBF, the first impedance matching layer being situated such that an acoustic signal emitted by the piezoelectric transducer will pass through the first impedance matching layer; and
a second impedance matching layer having an acoustic impedance AI2 between AI1 and AIBF, the second impedance matching layer being situated in the device such that an acoustic signal emitted by the transducer will pass through the second impedance matching layer after it passes through the first impedance matching layer;
wherein the first impedance matching layer has N independent first impedance matching layer regions that match and overlay the N independent transducer regions.

2. The device of claim 1 wherein the second impedance matching layer comprises a housing.

3. The device of claim 1 wherein the transducer is generally circularly disk shaped.

4. The device of claim 1 wherein the N independent transducer regions are concentric and generally circumferential.

5. The device of claim 1 wherein at least some of the N independent first impedance matching layer regions are mechanically decoupled from at least some of the other N independent first impedance matching layer regions.

6. The device of claim 1 wherein the N independent first impedance matching layer regions are separated by cuts in the second impedance matching layer.

7. The device of claim 1 wherein the acoustic impedances of the N independent first impedance matching layer regions are the same.

8. The device of claim 1 wherein the acoustic impedance of at least one of the N independent first impedance matching layer regions is different from one other of the N independent first impedance matching layer regions.

9. A method comprising:
emitting an acoustic pulse from a piezoelectric transducer, the transducer having N independent transducer regions wherein N is an integer, each of the N independent transducer regions having a thickness, each of the N independent transducer regions having an acoustic impedance AIT, each of the N independent transducer regions being independently excitable to oscillate in the thickness mode when electrically excited by a potential difference applied across the thickness;
passing the acoustic pulse through a first impedance matching layer having an acoustic impedance AI1 between AIT and a borehole fluid acoustic impedance AIBF; and
passing the acoustic pulse that has passed through the first impedance matching layer through a second impedance matching layer having an acoustic impedance AI2 between AI1 and AIBF;
wherein the first impedance matching layer has N independent first impedance matching layer regions that match and overlay the N independent transducer regions.

10. The method of claim 9 wherein the second impedance matching layer comprises a housing.

11. The method of claim 9 wherein the transducer is generally circularly disk shaped.

12. The method of claim 9 wherein the N independent transducer regions are concentric and generally circumferential.

13. The method of claim 9 wherein at least some of the N independent first impedance matching layer regions are mechanically decoupled from at least some of the other N independent first impedance matching layer regions.

14. The method of claim 9 wherein the N independent first impedance matching layer regions are separated by cuts in the second impedance matching layer.

15. The method of claim 9 wherein the acoustic impedances of the N independent first impedance matching layer regions are the same.

16. The method of claim 9 wherein the acoustic impedance of at least one of the N independent first impedance matching layer regions is different from one other of the N independent first impedance matching layer regions.

17. The device of claim 6 wherein the cuts are filled with one of a polymer with low shear stiffness and a fluid.

18. The device of claim 6 wherein the cuts extend into the piezoelectric transducer.

19. An apparatus comprising:
a housing;
a piezoelectric transducer mounted in the housing;
an impedance matching layer provided between the piezoelectric transducer and the housing;
wherein the impedance matching device includes a plurality of slots extending therethrough, said slots also extending partially through the piezoelectric transducer.

20. The apparatus of claim 19 wherein:
the plurality of cuts are circular in shape.

21. The apparatus of claim 19, wherein the piezoelectric transducer is a piezoelectric ceramic disk that includes N independent transducer regions, and wherein the impedance matching layer includes N independent matching layer regions that match and overlay the N independent transducer regions.

22. The apparatus of claim 21, wherein one of a polymer having a low shear stiffness or a fluid is inserted between adjacent ones of the N independent transducer regions.

23. The apparatus of claim 21, wherein each of the N independent matching layer regions has the same acoustic impedance.

24. The apparatus of claim 21, wherein at least one of the N independent matching layer regions has a different acoustic impedance to a different one of the N independent matching layer regions.

25. The apparatus of claim 19, wherein the piezoelectric transducer is cut into a plurality of square elements, wherein said plurality of square elements are connected to form a set of interconnected areas, each interconnected area simulating a ring shaped area.

26. The apparatus of claim 25, wherein the plurality of slots are located so as to match and overlay the set of interconnected areas.

27. The apparatus of claim 19, wherein the housing comprises a material having acoustic properties that are intermediate an acoustic impedance of the piezoelectric transducer and an acoustic impedance of a borehole fluid.

28. The apparatus of claim 19, wherein:
the piezoelectric transducer has an acoustic impedance $AIT$;
the impedance matching layer has an acoustic impedance $AI1$;
the housing has an acoustic impedance $AI2$; and
a borehole fluid has an acoustic impedance $AIBF$;
wherein:

$$AIT > AI1 > AI2 > AIBF.$$

29. The apparatus of claim 19 wherein the apparatus is incorporated into a well borehole acoustic measuring tool.

\* \* \* \* \*